(12) United States Patent
Enochs et al.

(10) Patent No.: US 11,810,160 B1
(45) Date of Patent: Nov. 7, 2023

(54) BUILDING MAPPING TOOLS

(71) Applicant: UIPCO, LLC, San Antonio, TX (US)

(72) Inventors: Andrew Enochs, San Antonio, TX (US); David Patrick Dixon, Boerne, TX (US); Samuel Ngure, Phoenix, AZ (US); Scott Matthew Myrick, Land O Lakes, FL (US); Davin Bernstein, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 460 days.

(21) Appl. No.: 17/214,094

(22) Filed: Mar. 26, 2021

Related U.S. Application Data (60) Provisional application No. 63/001,117, filed on Mar. 27, 2020.

(51) Int. Cl.
| | | |
|---|---|---|
| *G01S 19/25* | (2010.01) | |
| *G06Q 30/0283* | (2023.01) | |
| *G06T 7/62* | (2017.01) | |
| *G06T 7/00* | (2017.01) | |
| *H04N 13/204* | (2018.01) | |
| *G01N 29/265* | (2006.01) | |
| *G01N 29/06* | (2006.01) | |

(Continued)

(52) U.S. Cl.
CPC ......... *G06Q 30/0283* (2013.01); *G01N 29/06* (2013.01); *G01N 29/265* (2013.01); *G01S 19/25* (2013.01); *G06Q 50/16* (2013.01); *G06T 7/0002* (2013.01); *G06T 7/62* (2017.01); *G06V 20/176* (2022.01); *H04N 13/204* (2018.05); *G01N 2291/0289* (2013.01); *G06T 2207/10012* (2013.01); *G06T 2207/10132* (2013.01)

(58) Field of Classification Search
CPC ..... G01B 11/002; G01B 11/026; G01B 11/24; G01S 7/4865; G01S 17/89; G01S 7/4808; G01S 7/4972; G01S 17/87; G01S 17/894; G01S 19/25; G02B 26/105; G06Q 30/0283; G06Q 50/16; G01N 29/06; G01N 29/265; G01N 2291/0289; G06T 7/0002; G06T 7/62; G06T 2207/10012; G06T 2207/10132; G06V 20/176; H04N 13/204
USPC .......................................... 356/614; 382/149
See application file for complete search history.

(56) References Cited

U.S. PATENT DOCUMENTS

9,632,504 B1 * 4/2017 Watts ................... G05D 1/0231
2016/0291160 A1 * 10/2016 Zweigle ................ G01S 7/4813
(Continued)

*Primary Examiner* — Isiaka O Akanbi
(74) *Attorney, Agent, or Firm* — Potomac Law Group, PLLC (57) ABSTRACT

System, methods, and apparatus for determining a foundation profile of a floor and/or a room profile of a room based on information obtained by a scanner device. For example, a scanner device can perform a scan operation of at least one floor in at least one room, generate a foundation profile that describes at least an area underneath the at least one floor based on the scan operation, and generate and send, to a server, a message comprising the foundation profile for the at least one floor and a location of the building. The server can receive the message, determine, based on the location of the building, an account identifier that uniquely identifies an account associated with the building, and store the foundation profile for the at least one floor in a database in a location associated with the account identifier.

19 Claims, 5 Drawing Sheets

(51) Int. Cl.
*G06Q 50/16* (2012.01)
*G06V 20/10* (2022.01)

(56) References Cited

U.S. PATENT DOCUMENTS

| | | | |
|---|---|---|---|
| 2018/0136337 A1* | 5/2018 | Zohar | G05D 1/024 |
| 2019/0248013 A1* | 8/2019 | Deyle | G05D 1/0094 |
| 2020/0019156 A1* | 1/2020 | Drew | A47L 11/24 |
| 2020/0150655 A1* | 5/2020 | Artes | G05D 1/0214 |
| 2020/0272165 A1* | 8/2020 | Ran | G05D 1/0061 |
| 2023/0033781 A1* | 2/2023 | Deyle | G01S 13/74 |

* cited by examiner

BUILDING MAPPING TOOLS

CROSS-REFERENCE TO RELATED APPLICATION(S)

This application is a non-provisional of and claims priority to U.S. Provisional Application No. 63/001,117, filed on Mar. 27, 2020, entitled "BUILDING MAPPING TOOLS," which is hereby incorporated by reference in its entirety for all purposes.

BACKGROUND

Potential home buyers purchase homes without the benefit of having detailed information about the condition of their homes. For example, a person may initiate the process of purchasing a home and can request a home inspector to assess the condition of the home. However, a home inspector may not be able to provide complete information about the condition of the home at least because some aspects of the home (e.g., foundation) cannot be visually inspected and its state cannot be fully assessed at least due to the presence of flooring in the home. Similarly, when homeowners file a claim to have their property fixed, homeowner's insurance providers often do not have sufficient information about the condition of the home to assess the extent of the damage that needs to be fixed.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Currently, information regarding attributes of a building may be inaccurate or insufficient when such information is needed such as when a potential home buyer seeks to purchase a home or when a homeowner files a claim to have a damaged area within the home fixed. Attributes of a building may include, for example, dimensions of the rooms in a home or a condition of the foundation underneath the floor. Such attributes, among others, cannot be accurately or efficiently ascertained at least because current home evaluation techniques do not utilize the latest advancements in technology. Thus, this patent document describes systems, devices, and methods where a profile of a room or a floor can be generated based on results obtained by scanners and/or cameras located on or in a movable scanner device that operates within a building.

Figure 1:
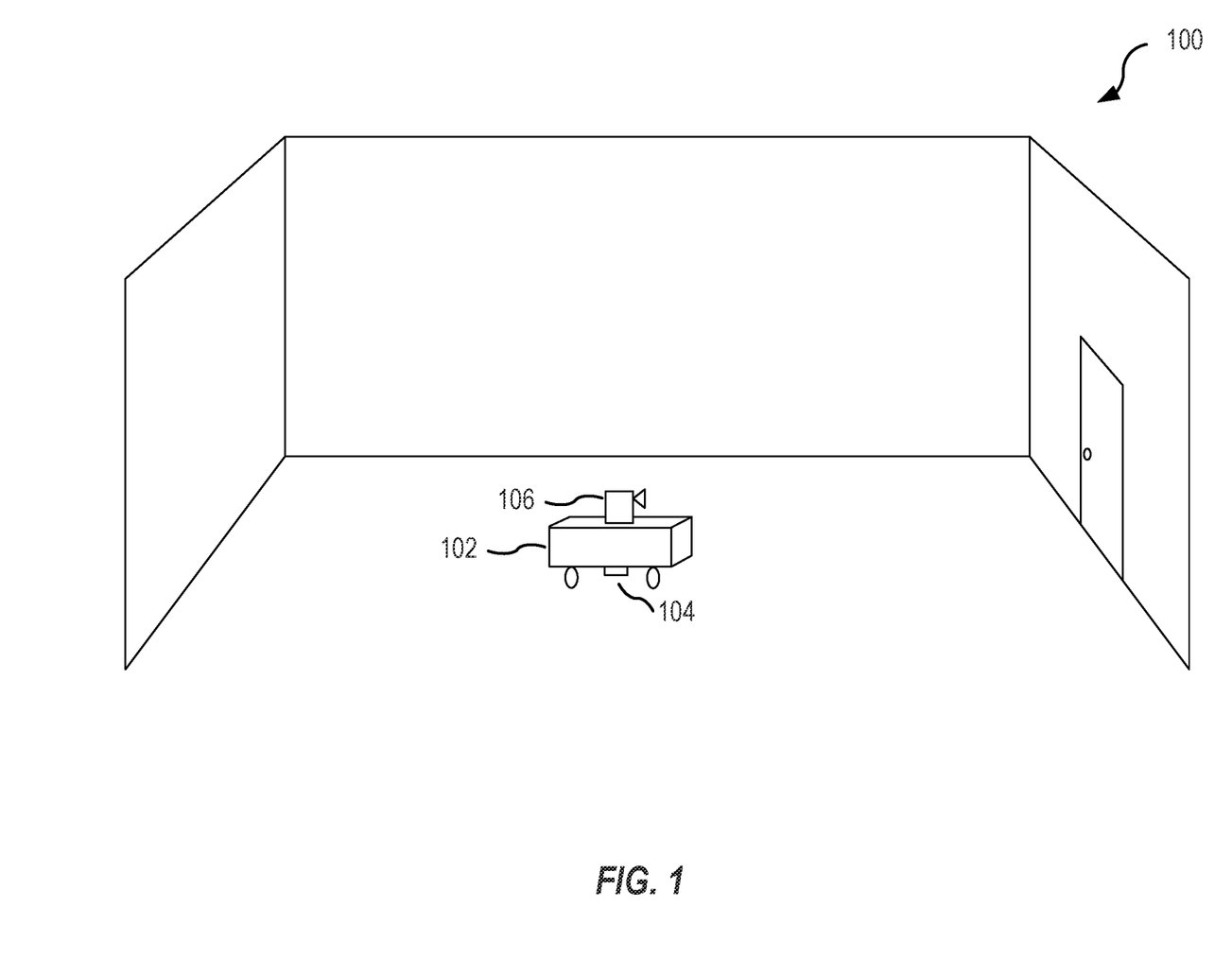
FIG. 1 shows an example of a room that includes a scanner device operable to scan and/or obtain information about the room in accordance with embodiments of the technology.

FIG. 1 shows an example of a room 100 that includes a scanner device 102 operable to scan and/or obtain information about the room. The scanner device 102 includes motors that can operate the wheels located on or below the scanner device 102. The motors enable the scanner device 102 to move on top of the floor in the room 100 so that the scanner device 102 may not need a human to manually move the scanner device 102 from one location within the room to another location within the room. In some embodiments, a scan module (shown as 370 in FIG. 3) may operate conventional algorithms to move the scanner device 102 to various locations on the floor of the room 100 so that the scanner device can perform a scan operation of the floor. Thus, the scan module can instruct the motors to automatically move the scanner device 102 on top of the floor of the room 100.

The scan module can perform a scan operation of a floor in the room 100. The scan operation can be performed using an ultrasonic sensor 104 that may be located underneath the scanner device 102. The ultrasonic sensor 104 can transmit and receive ultrasonic signals to obtain information about an area underneath the floor of the room 100. The scan module can generate a foundation profile for the floor of the room 100, where the foundation profile describes at least the area underneath the floor, and where the foundation profile is generated based on the transmitted and received ultrasonic signals. In some embodiments, the foundation profile of the floor may include attributes of the floor, where the attributes include a thickness of the floor and a type of the floor (e.g., tile, carpet, hardwood, or laminate). The scan operation of the floor may include scanning the entire floor or scanning the partial floor such as when objects located on the floor (e.g., dressers, cabinets, etc.) may prevent the scanner device from scanning the entire floor.

In some embodiments, the scan module can transmit and receive ultrasonic signals, process the received ultrasonic signals, and generate the foundation profile by generating a map of the area underneath the floor of the room 100. The map of the floor may include one or more cracks in the area underneath the floor. The scan module can include in the generated map one or more measurements that describe extent (e.g., dimensions such as width and/or depth) of the one or more cracks in the area underneath the floor. In some embodiments, the dimensions of the cracks may be included in various points along the cracks such as at locations where the measured dimension exceed a pre-determined dimension value. The scan module can perform the scan operation and movement of the scanner device 102 in one or more rooms within a home or building so that one or more floors and/or one or more rooms in a building can be scanned.

The scan module can also generate and send to a building profile server a message comprising the foundation profile of the floor and a location of the room 100 where the scan operation is being performed. In some embodiments, the scanner device 102 may include a cellular transceiver (shown as 330 in FIG. 3) with which the scan module can send the message comprising and the foundation profile of the floor and with which the scan module can obtain the location of the room 100 that is obtained using a geolocation technique performed using an assisted global positioning system (AGPS). The building profile server can receive the message and process it as further described in FIG. 2.

As shown in FIG. 1, the scanner device 102 may also include a three-dimension (3D) camera system 106. The 3D camera system 106 may include cameras that may be located on top of the scanner device 102. The cameras may be positioned on top of the scanner device 102 to obtain multiple images of the room 100 so that the multiple images can fully describe the room 100. The scan module can operate the 3D camera system to obtain the images and to transmit the images via the transceiver to the building profile server for image processing as further described in this patent document.

Figure 2:
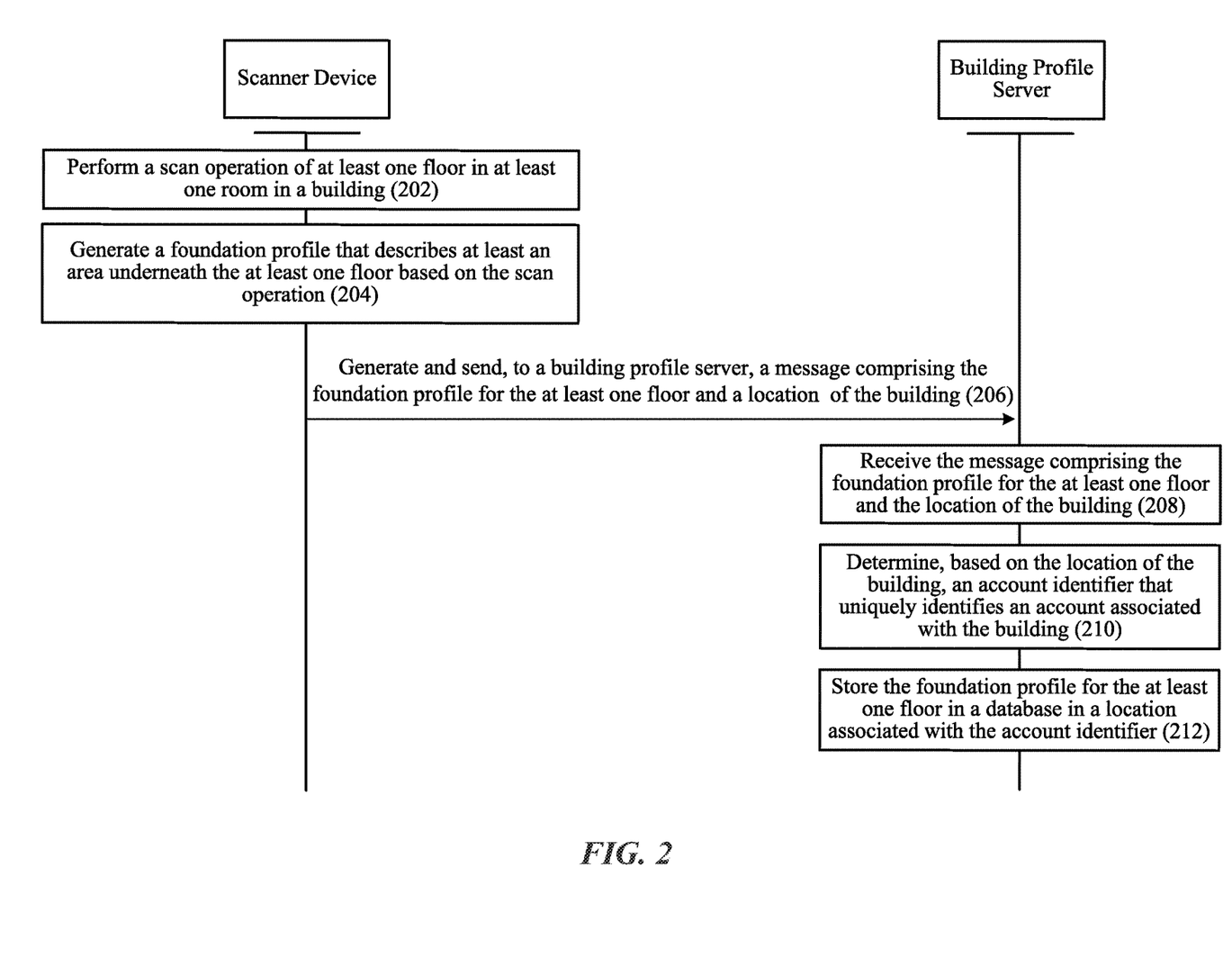
FIG. 2 shows an example system for obtaining building profile related information in accordance with embodiments of the technology.

FIG. 2 shows an example system for obtaining building profile related information. At operation 202, the scan module of the scanner device performs a scan operation of at least one floor in at least one room in a building. The scanner device is operable to automatically move on top of the at least one floor, and the scanner device includes an ultrasonic sensor operable to transmit and receive ultrasonic signals to obtain information about an area underneath the floor. At operation 204, the scan module generates a foundation profile that describes at least the area underneath the at least one floor based on the scan operation. The foundation profile may include a map of one or more cracks in the area underneath the at least one floor and/or one or more measurements that describe extent of the one or more cracks. The foundation profile may also include attributes of the at least one floor such as thickness of the floor or material/type of the floor. At operation 206, the scan module generates and sends, to a building profile server, a message comprising the foundation profile for the at least one floor and a location of the building.

At operation 208, a foundation profile module of the building profile server (shown as 440 in FIG. 4) receives the message that includes the foundation profile for the at least one floor and the location of the building. At operation 210, the foundation profile module determines, based on the location of the building, an account identifier that uniquely identifies an account associated with the building. The account identifier may be a membership identifier of a person who owns or rents the building. At operation 212, the foundation profile module stores the foundation profile for the at least one floor in a database in a location associated with the account identifier.

In some embodiments, additional information about one or more rooms can be obtained from the scanner device. For example, the scanner device may include a 3D camera system so that the scan module of the scanner device may obtain images of at least one room in the building. The scan module can send the obtained images to the building profile server for image processing. The room profile module of the building profile server (shown as 450 in FIG. 4) receives the images and performs image processing operation on the images. The room profile module can use conventional image processing techniques to determine dimensions (e.g., one or more lengths, one or more widths, and one or more heights) of the room. For rooms that may be shaped like a cube or a rectangular cuboid, a single length, a single width, and a single height may be sufficient to describe the dimensions of the room. For rooms with irregular shapes (e.g., trapezoid with raised ceiling), multiple heights, widths, and lengths may be used to describe the dimensions of such rooms.

The room profile module can generate, after the image processing operation, a room profile that describes dimensions of the at least one room. The values for the dimensions are obtained from the result of the image processing operation. The room profile module can store the one or more room profiles in the database in the location associated with the account identifier. The account identifier may be identified based on the location of the building related information provided by the scanner device when sending the images to the building profile server.

Figure 3:
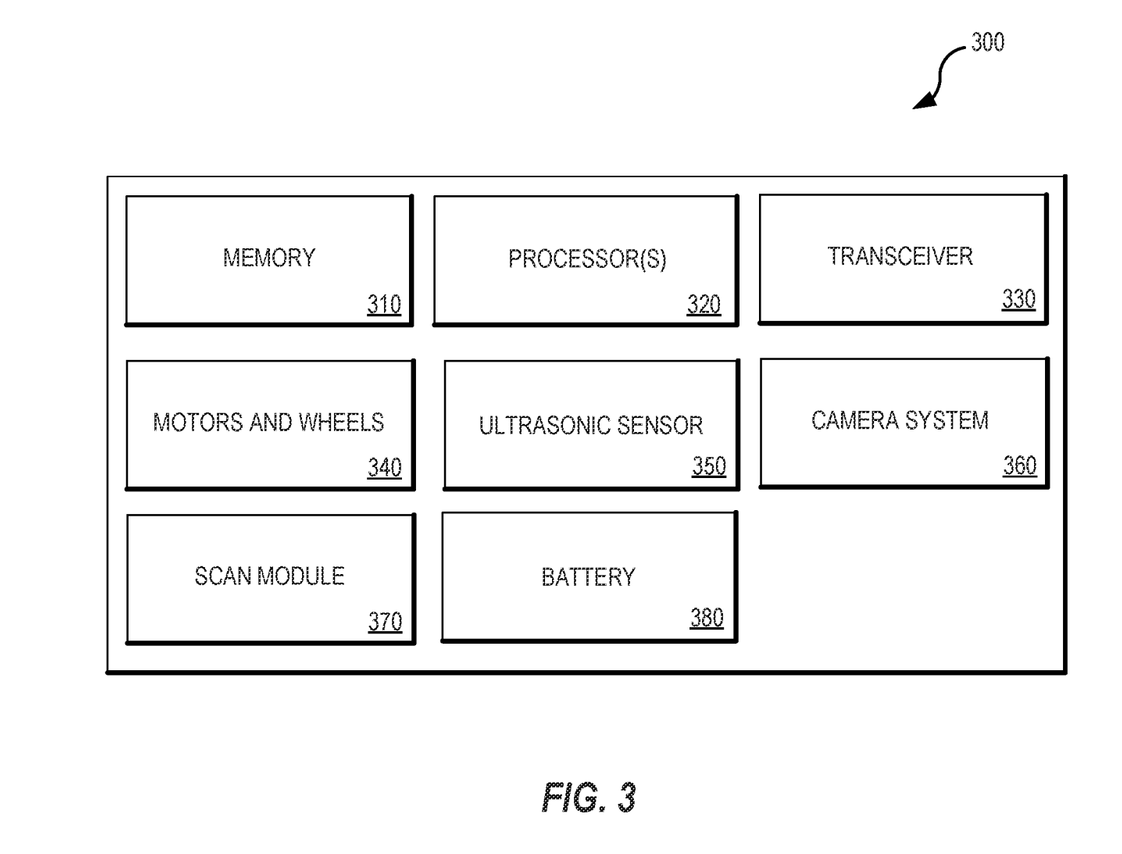
FIG. 3 shows a block diagram of a scanner device operated to obtain information related to a floor and/or room of a building in accordance with embodiments of the technology.

The image processing being performed by the building profile server can be an advantageous technical benefit at least because the scanner device is operated using an onboard battery (shown as 380 in FIG. 3). Thus, the battery resources of the scanner device may be more effectively utilized for performing scan operations and/or obtaining images. However, in some embodiments, the scan module of the scanner device can perform image processing operation on the images obtained by the 3D camera system of the at least one room to generate a room profile that describes the dimension of the at least one room. In such embodiments, the scan module can generate and send, to the building profile server, a message comprising the room profile and the location of the building. The room profile module of the building profile server receives the message comprising the room profile and the location of the building and stores the room profile in the database in the location associated with the account identifier.

In some embodiments, the foundation profile and/or room profile related information can be used to determine a cost estimate to repair or replace a damaged region located within the room and/or located on a floor of a room. For example, a cost estimator module of the building profile server (shown as 460 in FIG. 4) can receive information related to a damaged region in at least one floor or in at least one room of a building. The damaged region may be located only in the at least one floor or only in the wall(s) of the at least one room or a combination thereof. The information related to the damaged region may include, for example, an address of the building that includes the damaged region, dimensions of the damaged region, and location of the damaged region (e.g., on the floor, on the wall(s), or on both the floor and wall(s)).

In some embodiments, the scan operation described in FIG. 2 and the image processing operation described in this patent document are performed after the information related to the damaged region is received. In such embodiments, the cost estimator module can obtain the address of the building where the damaged region is location and can send a message to another server to send the scanner device to the address. Using the techniques described in this patent document, the scanner device may perform the scan operation and/or image processing operation of at least the room that includes the damaged region after the scanner device is received and operated in the at least one room.

The cost estimator module can determine a cost estimate to replace or repair the damaged region based on the dimensions of the damaged region and based on the foundation profile of the at least one floor, the room profile of the at least one room, or a combination thereof. For example, the cost estimator module can determine cost of repairing or replacing a damaged region based on the received information that the damaged region is only located in the floor and based on the foundation profile that may indicate one or more cracks in the foundation or attributes of the floor (e.g., type of flooring, thickness, etc.). In another example, the cost estimator module can determine cost of repairing or replacing a damaged region based on the received information that the damaged region is only located in one wall in the room and based on the room profile that may indicate dimensions of the room.

FIG. 3 shows a block diagram of a scanner device 300 operated to obtain information related to a floor and/or room of a building. The scanner device 300 includes at least one processor 320 and a memory 310 having instructions stored thereupon. The instructions upon execution by the processor 320 configure the scanner device 300 to perform the operations described in FIGS. 1 and 2, and to perform the operations associated with motor and wheels 340, ultrasonic sensor 350, 3D camera system 360, scan module 370, and battery 380 as described in this patent document.

According to the embodiments shown in FIG. 3, the scanner device 300 can include cellular transceiver 330 which is an advantageous technical feature that allows the scanner device 300 to wirelessly transmit information obtained while or after the scan operation on the floor is performed and/or images of the room are obtained. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module.

Figure 4:
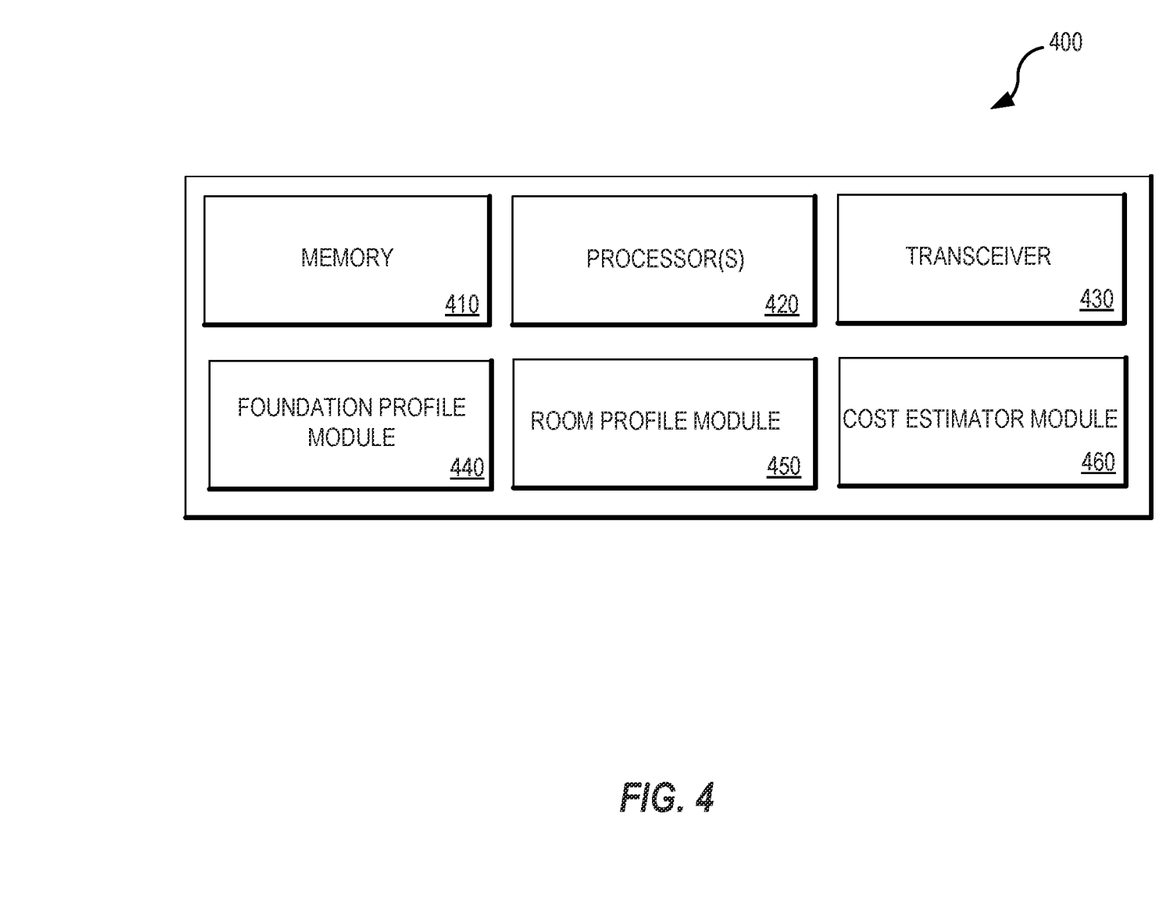
FIG. 4 shows a block diagram of a building profile server operated to process the information obtained by the scanner device to generate the foundation profile and/or room profile in accordance with embodiments of the technology.

FIG. 4 shows a block diagram of a building profile server 400 operated to process the information obtained by the scanner device related to the foundation profile and/or room profile. The building profile server 400 includes at least one processor 420 and a memory 410 having instructions stored thereupon. The instructions upon execution by the processor 420 configure the building profile server 400 to perform the operations described in FIG. 2 and to perform the operations associated with the foundation profile module 440, room profile module 450, and cost estimator module 460 as described in this patent document.

Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. The building profile server 400 includes a transceiver (e.g., a transmitter and a receiver). The receiver can receive the message, images, and/or location of the building sent by the scanner device.

Memory 310, 410 can be any device, mechanism, or populated data structure used for storing information. In accordance with some embodiments of the present disclosure, memory 310, 410 can encompass, but is not limited to, any type of volatile memory, nonvolatile memory, and dynamic memory. For example, memory 310, 410 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 310, 410 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 310, 410.

Memory 310, 410 may be used to store instructions for running one or more applications or modules on processor(s) 320, 420. For example, memory 310, 410 could be used in one or more embodiments to house all or some of the instructions needed to execute the functionality of the various modules.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
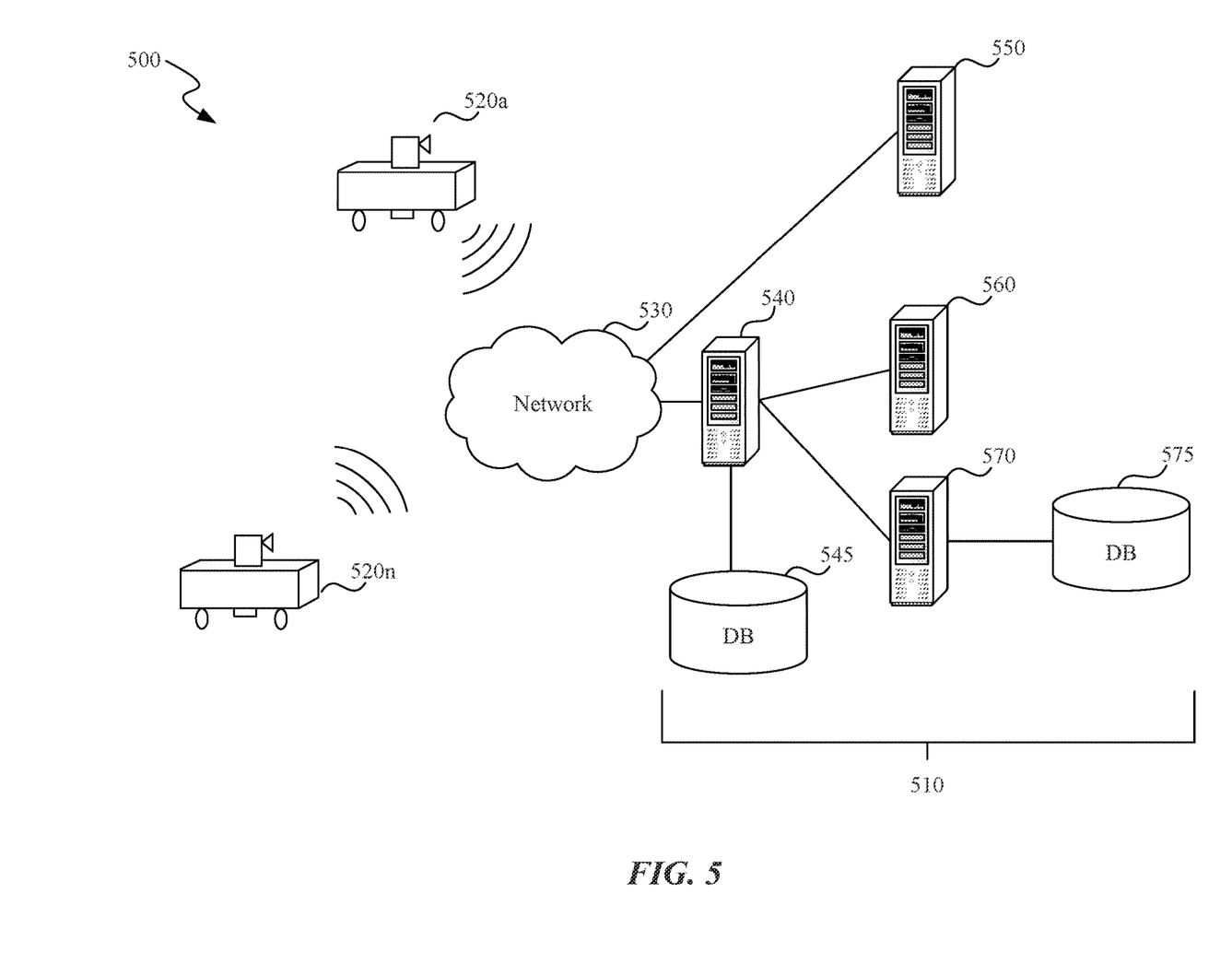
FIG. 5 shows an example system 500 where scanner devices provide information related to the scan operations and/or images and/or location of the buildings to a building profile system.

FIG. 5 shows an example system 500 where scanner devices 520a to 520n provide information related to the scan operations and/or images and/or location of the buildings to a building profile system 510. A building profile system 510 may include a building profile server 540 used by the scanner devices to provide information related to the scan operation and/or images and/or location of the buildings, one or more servers 550, 560, 570, and one or more databases 545, 575. One or more of servers 540 to 570 may include the devices and application(s) described in FIG. 4, and scanner devices 520a to 520n may include the devices and application(s) described in FIG. 3. Data located on the one or more servers 540, 550, 560, and 570 or on the one or more databases 545, 575 can be accessed via the network 530, such as the Internet or Intranet. For example, the scanner devices 520a to 520n can provide information related to the scan operation and/or images and/or location of the buildings to a server and/or database(s) associated with the building profile system 510 via the network 530.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are non-transitory computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for mapping a structure in a building, comprising:
   a movable scanner device comprising a first processor configured to:
      perform a scan operation of at least one floor in at least one room in a building,
         wherein the movable scanner device is operable to automatically move on top of the at least one floor, and
         wherein the movable scanner device includes an ultrasonic sensor operable to transmit and receive ultrasonic signals to obtain information about an area underneath the at least one floor;
      generate a foundation profile that describes at least the area underneath the at least one floor based on the scan operation,
         wherein the foundation profile includes a map of one or more cracks in the area underneath the at least one floor and one or more measurements that describe extent of the one or more cracks; and
      generate and send, to a server, a message comprising the foundation profile for the at least one floor and a location of the building; and
   the server comprising a second processor configured to:
      receive the message comprising the foundation profile for the at least one floor and the location of the building;
      determine, based on the location of the building, an account identifier that uniquely identifies an account associated with the building; and
      store the foundation profile for the at least one floor in a database in a location associated with the account identifier.

2. The system of claim 1,
   wherein the movable scanner device comprises a three-dimension (3D) camera system, and wherein the first processor of the movable scanner device is further configured to:
obtain, from the 3D camera system, images of the at least one room in the building;
send the images and the location of the building to the server;
wherein the server comprising the second processor is further configured to:
receive the images and the location of the building;
perform an image processing operation using the images, wherein the image processing operation provides dimensions of the at least one room in the building; and
generate, after the image processing operation, a room profile that describes dimensions of the at least one room; and
store the room profile in the database in the location associated with the account identifier, wherein the account identifier is identified based on the location of the building.

3. The system of claim 2, wherein the server comprising the second processor is further configured to:
receive information related to a damaged region in the at least one floor or in the at least one room, wherein the information comprises dimensions of a damaged region; and
determine a cost estimate to replace or repair the damaged region based on the dimensions of the damaged region and based on the foundation profile of the at least one floor, the room profile of the at least one room, or a combination thereof.

4. The system of claim 3, wherein the scan operation and the image processing operation are performed after the information related to the damaged region is received.

5. The system of claim 2, wherein the movable scanner device includes a cellular transceiver operable to transmit the message and the one or more images, and wherein the location of the building is obtained using a geolocation technique performed using an assisted global positioning system (AGPS).

6. The system of claim 1, wherein foundation profile includes attributes of the at least one floor, and wherein the attributes include a thickness of the at least one floor and a type of the at least one floor.

7. The system of claim 6, wherein the type of the at least one floor includes tile, carpet, hardwood, or laminate.

8. A method of mapping a structure in a building, comprising:
receiving, from a scanner device, a message comprising a foundation profile of at least one floor in at least one room in a building and a location of the building
wherein the foundation profile includes a map of one or more cracks in the area underneath the at least one floor and one or more measurements that describe extent of the one or more cracks
determining, based on the location of the building, an account identifier that uniquely identifies an account associated with the building; and
storing the foundation profile for the at least one floor in a database in a location associated with the account identifier.

9. The method of claim 8, further comprising:
receiving, from the scanner device, images of the at least one room in the building and the location of the building;
performing an image processing operation using the images, wherein the image processing operation provides dimensions of the at least one room in the building; and
generating, after the image processing operation, a room profile that describes dimensions of the at least one room; and
storing the room profile in the database in the location associated with the account identifier, wherein the account identifier is identified based on the location of the building.

10. The method of claim 9, further comprising:
receiving information related to a damaged region in the at least one floor or in the at least one room, wherein the information comprises dimensions of a damaged region; and
determining a cost estimate to replace or repair the damaged region based on the dimensions of the damaged region and based on the foundation profile of the at least one floor, the room profile of the at least one room, or a combination thereof.

11. The method of claim 10, wherein the scan operation and the image processing operation are performed after the information related to the damaged region is received.

12. The method of claim 8, wherein foundation profile includes attributes of the at least one floor, and wherein the attributes include a thickness of the at least one floor and a type of the at least one floor.

13. The method of claim 12, wherein the type of the at least one floor includes tile, carpet, hardwood, or laminate.

14. A non-transitory computer readable storage medium having code stored thereon, the code, when executed by a processor, causing the processor to implement a method comprising:
receiving, from a scanner device, a message comprising a foundation profile of at least one floor in at least one room in a building and a location of the building,
wherein the foundation profile includes a map of one or more cracks in the area underneath the at least one floor and one or more measurements that describe extent of the one or more cracks
determining, based on the location of the building, an account identifier that uniquely identifies an account associated with the building; and
storing the foundation profile for the at least one floor in a database in a location associated with the account identifier.

15. The non-transitory computer readable storage medium of claim 14, wherein the method further comprises:
receiving, from the scanner device, images of the at least one room in the building and the location of the building;
performing an image processing operation using the images, wherein the image processing operation provides dimensions of the at least one room in the building; and
generating, after the image processing operation, a room profile that describes dimensions of the at least one room; and
storing the room profile in the database in the location associated with the account identifier, wherein the account identifier is identified based on the location of the building.

16. The non-transitory computer readable storage medium of claim 15, wherein the method further comprises:

receiving information related to a damaged region in the at least one floor or in the at least one room, wherein the information comprises dimensions of a damaged region; and determining a cost estimate to replace or repair the damaged region based on the dimensions of the damaged region and based on the foundation profile of the at least one floor, the room profile of the at least one room, or a combination thereof.

17. The non-transitory computer readable storage medium of claim 16, wherein the scan operation and the image processing operation are performed after the information related to the damaged region is received.

18. The non-transitory computer readable storage medium of claim 14, wherein the foundation profile includes attributes of the at least one floor, and wherein the attributes include a thickness of the at least one floor and a type of the at least one floor.

19. The non-transitory computer readable storage medium of claim 18, wherein the type of the at least one floor includes tile, carpet, hardwood, or laminate.

\* \* \* \* \*